United States Patent [19]

Hibi et al.

[11] Patent Number: 5,245,417
[45] Date of Patent: Sep. 14, 1993

[54] GROUND FOG AND GROUND REMOVING SYSTEM FOR IMAGE FORMING APPARATUS

[75] Inventors: Yoshiharu Hibi; Katuyuki Kouno; Mitsuo Fukutomi, all of Kanagawa, Japan

[73] Assignee: Fuji Xerox Co., Ltd., Tokyo, Japan

[21] Appl. No.: 865,248

[22] Filed: Apr. 8, 1992

[30] Foreign Application Priority Data

Apr. 17, 1991 [JP] Japan .................................. 3-85240
Sep. 13, 1991 [JP] Japan .................................. 3-234923

[51] Int. Cl.⁵ .............................................. H04N 1/46
[52] U.S. Cl. ........................................ 358/515; 358/518
[58] Field of Search ................. 358/75, 80, 95, 464; 395/131; 346/157

[56] References Cited

U.S. PATENT DOCUMENTS

4,977,448 12/1990 Murata .................................. 358/75

*Primary Examiner*—Edward L. Coles, Sr.
*Assistant Examiner*—Scott A. Rogers
*Attorney, Agent, or Firm*—Finnegan, Henderson, Farabow, Garrett & Dunner

[57] ABSTRACT

A ground detection means 10 for detecting the ground level of a document and a data correction means 11 for calculating correction data based on the detected ground level are provided. The ground level of the document is detected by prescanning and the correction data is calculated therefrom so that parameters of color conversion means 2, 3 are changed by the correction data. The correction data is set by approximating the detected ground level with a linear function. As a result of the above construction, the correction data is generated easily to thereby remove ground fog and exclude back-side images of the document. In addition, if the ground level is detected by a lightness signal L* and corrected by the lightness signal L* or a color-separated signal BGR, the correction can be achieved by correcting the parameters of a matrix that converts the color-separated signals B, G, R to a system value (L*a*b*) signal.

8 Claims, 5 Drawing Sheets

GROUND FOG AND GROUND REMOVING SYSTEM FOR IMAGE FORMING APPARATUS

BACKGROUND OF THE INVENTION

1. Field of the Invention

The present invention relates to a ground fog and ground removing system for a color image forming apparatus that produces an image by converting color-separated signals B, G, R into colorant recording signals Y, M, C, K through a color conversion means.

2. Related Art

A digital copying machine converts an analog signal read from a document into multi-valued digital data, subjects the converted data to image quality adjustment such as for granularity, tone characteristic, definition, etc., and records and reproduces an image with dots. The use of the multi-valued digital data allows not only image data processing producing a high-definition, well reproduced image, but also various correcting and editing functions using such data in combination with a memory to be performed with ease.

Also, a full-color digital copying machine reads a document optically, color-converts by correction the color-separated read signals B (blue), G (green), R (red) into recording signals Y (yellow), M (magenta), C (cyan) for colorant such as toner, ink, or ink doner film, and reproduces the full-color document by generally superposing the dotted images formed by the respective colorants one upon another. In this case, since the image formed by using the colorants in equivalent quantities turns achromatic, a technique for removing the recording signal components Y, M, C in equivalent quantities (UCR: under color removal) is employed to avoid wasteful consumption of the colorants. However, the UCR process, reducing the consumption of the colorants, impairs depth and thickness in each produced color, thus disadvantageously giving the reproduced color image an impression of scarce voluminosity as a whole. In addition, reproduction of gray and black being incompatible with reproduction of colors of high chroma, a simple UCR process cannot adequately improve color reproducibility. To supplement such insufficient voluminosity in color reproduction or to produce gray, black or Chinese ink (K) is generated so as to correspond to the quantities of colorants to be subjected to under color removal. A summary of a digital color image forming apparatus as disclosed, for example, in Unexamined Japanese Patent Publication No. Hei. 2-70173 proposed by the applicant will hereunder be described.

Figure 6:
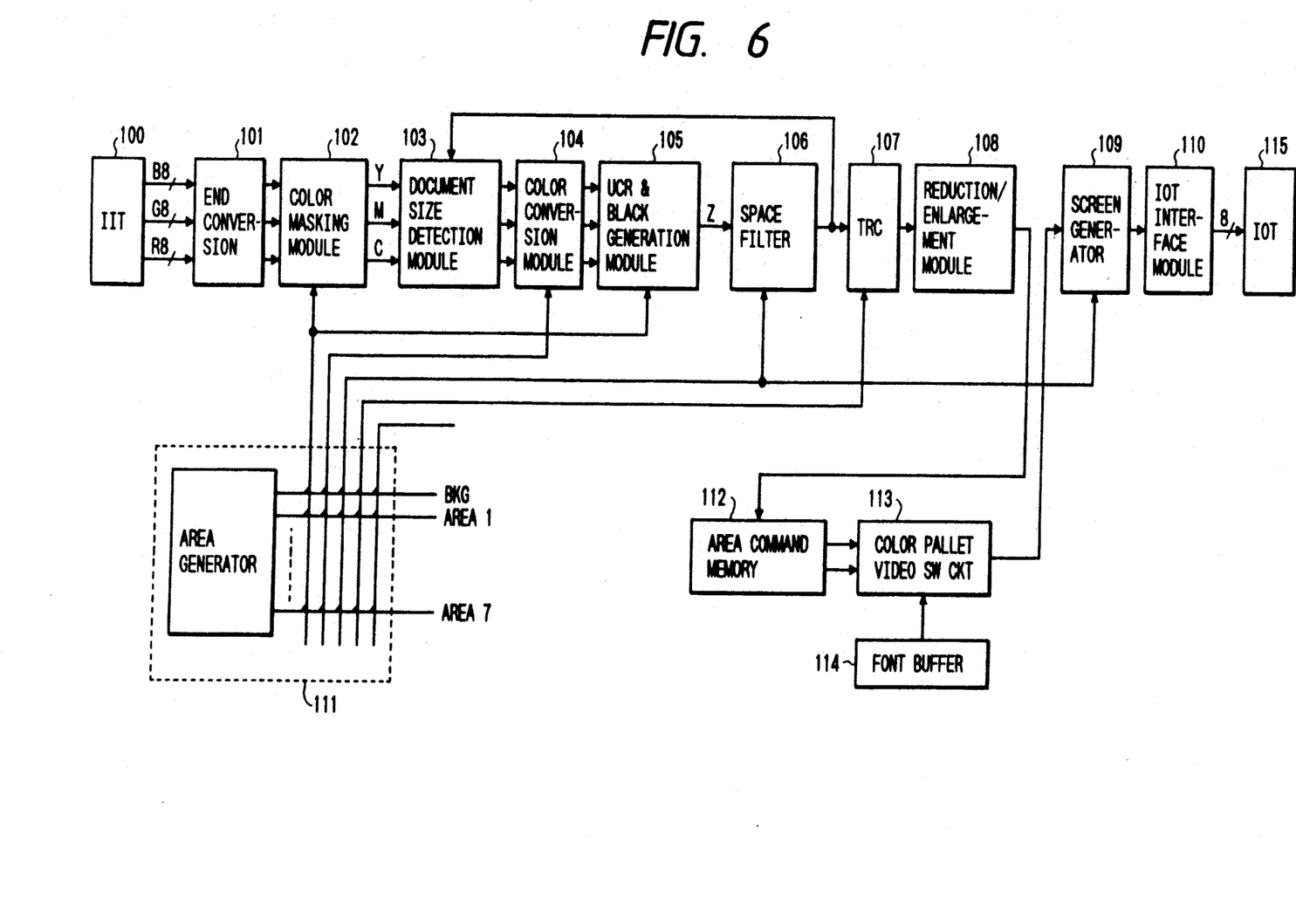
FIG. 6 is a diagram showing an exemplary configuration of a digital color image forming apparatus.

FIG. 6 is a diagram showing an exemplary configuration of a digital color image forming apparatus.

In FIG. 6, an IIT (image input terminal) 100 reads a document using CCD sensors and converts the read color-separated signals B, G, R into digital image data; and an IOT (image output terminal) 115 reproduces a color image by subjecting the image data to an exposing process by a laser beam and to a developing process. Components from an END (equivalent neutral density) conversion circuit 101 to an IOT interface 110 interposed between IIT 100 and IOT 115 constitute an image data edit processing system (IPS, or image processing system), which converts the read signals B, G, R into toner recording signals Y, M, C, and a recording signal K, and selects and outputs a recording signal corresponding to a developing color every developing cycle. Here, when converting the read signals (B, G, R signals) into the recording signals (Y, M, C, K signals), what matters is how to achieve color balance adjustment, color reproduction matching the input characteristic of the IIT and the output characteristic of the IOT, density and contrast balance adjustment, edge enhancement, dullness and moire adjustment, etc.

IIT 100 reads a pixel by the unit of 16 dots/mm for the read signals B, G, R using the CCD sensors, and outputs the read pixel in 24 bit-data (3 colors × 8 bits in 256 tone levels). Each of the CCD sensors, covered with filters respectively corresponding to B, G, R on their surfaces, is 300 mm long at a density of 16 dots/mm, and scans 16 lines/mm at a process speed of 190.5 mm/sec, thereby outputting the read data at a speed of about 15M pixels/sec every color. IIT 100 converts analog data of B, G, R pixels into logarithmic data to thereby convert reflectance data into density data, and further converts the density data into digital data.

The IPS is provided to receive the read signals B, G, R from IIT 100, subject the received signals to various kinds of data processing to improve reproducibility or the like in color, tone, and definition, select a development process color recording signal out of the recording signals Y, M, C, K, convert the selected signal into an on/off signal, and apply the converted signal to IOT 115.

As shown in FIG. 6, the IPS consists of edit control modules including: an END conversion module 101 that adjusts (converts) data into a gray-balanced color signal; a color masking module 102 that converts the read signals B, G, R into recording signals Y, M, C corresponding to respective toner quantities by subjecting the B, G, R signals to matrix calculation; a document size detection module 103 that detects the size of a document at the time of prescanning and deletes a platen color (frame) during scanning; a color conversion module 104 that converts a color specified in a predetermined area in accordance with an area signal inputted from an area image control module; a UCR and black generation module 105 that not only generates such an appropriate quantity of K as not to cause turbidity in a produced color and reduces Y, M, C equally so as to correspond to the quantity of the generated K, but also gates the K signal as well as the under color-removed Y, M, C signals in accordance with signals in a monochromatic mode and in a full-color mode; a space filter 106 that performs the function of recovering dullness and removing moires; a TRC (tone reproduction control) module 107 that performs such processing as density and contrast adjustment to improve reproducibility, reversion between negative and positive images, and color balance adjustment; a reduction and enlargement module 108 that performs reduction and enlargement processing in the main scanning direction; a screen generator 109 that converts a toner signal expressed in process color tone into an on/off binary-coded toner signal and outputs such binary-coded toner signal; an IOT interface module 110; an area image control module 111 that includes an area generating circuit and a switch matrix; an area command memory 112; a color pallet video switch circuit 113; and a font buffer 114.

The conventional digital color image forming apparatus produces colorant recording signals Y, M, C, which are the subtractive primaries (in printers), from the color-separated read signals B, G, R, and various basic parameters involved in the course of preparing the colorant recording signals Y, M, C are fixed and they are determined based on a reference input-to-output correspondence. Thus, any poorly reproduced colors are usually adjusted in accordance with the user's preference using the tone adjustment function.

For a document consisting essentially of characters on a white ground, if colored paper, newspaper, straw paper, reproduced paper, or the like is used, it sometimes happens that the density of such paper itself appears as fog, impairing the quality of a reproduced image. To overcome this problem, a ground removal technique or the like involving the steps of obtaining a histogram by sample scanning and deliberately detecting the density of the ground or the like is adopted, as disclosed, for example, in Japanese Patent Application No. Hei. 2-145104 or Unexamined Japanese Patent Publication No. Hei. 2-224466, when making a black and white copy. When making a color copy, no ground removal is usually effected since highlights that are close to the background color must be reproduced well.

However, some documents to be color-separated use thick paper that is relatively opaque and some use thin paper that is relatively transmissive, and depending on the quality of paper as well as the platen cover lining material of the IIT, ground fog may, in some cases, show in greater degree than with ordinary paper.

For example, a white platen cover lining, with its high reflectance, causes irregular reflection even over the surface of a thin-sheet document that is relatively transmissive, thus exhibiting little reduction in reflectance. The same applies to the mirror surface platen cover lining such as one employed in the conventional digital color image forming apparatus. One of the reasons why the mirror surface is employed is that reflection by a single mirror body allows a white-ground document to be sensed easily in a later process with the document having been inputted at a low reflectance at the IIT.

However, if an automatic document feeder or the like is installed, a large friction coefficient is required to forward the sheet, which permits use of no mirror surface-finished cover of ordinary type. It is why a rubber belt is usually employed. However, since the rubber belt does not provide the benefits of the mirror surface, the user must choose between no document sensing using a white belt and the ground fog present on a thin sheet that is relatively easy to transmit light using a low reflectance belt. Otherwise, he must take some measure against ground fog present on the thin sheet that is relatively transmissive.

When a thin sheet document which is relatively transmissive and which is printed on both sides is read using the platen cover lining that is either white or mirror surface-finished, the image printed on the back side may, in some cases, be read together with the image on the front side. In contrast thereto, a low-reflectance type platen cover lining provides the advantage of not copying the image on the back side, but suffers from ground fog.

SUMMARY OF THE INVENTION

The invention has been made to overcome the above problems. Accordingly, an object of the invention is to provide a ground removal system for an image forming apparatus which can remove ground fog and back-side images of a document without taking any measure to the material, color, or finish of a platen cover lining.

To achieve the above object, the invention is applied to a ground fog removing system for an image forming apparatus such as a color image forming apparatus in which color-separated signals B, G, R are converted into colorant recording signals Y, M, C through a color conversion means. The system comprises a ground level detection means for detecting the level of a ground of a document and a data correction means for calculating correction data based on the detected ground level, and the system detects the level of the ground of the document by prescanning and calculates the correction data so as to change parameters of the color conversion means in accordance with the correction data. Further, the correction data is set by approximating the detected ground level with a linear function. As a result of the above construction, the correction data can be generated easily and ground fog and back-side images of the document can thereby be removed.

Still further, since the ground level is detected by a lightness signal L* and is corrected either by the lightness signal L* or color-separated signals B, G, R, the correction can be achieved by correcting the parameters of a matrix that converts the color separated signals B, G, R into system value (L*a*b*) signals.

Still further, a ground removing circuit is provided at a recording signal output section so that a broken-line correction is effected from a ground level threshold. As a result, ground removal free from erratic jumps in tone and shifts in the entire image can be achieved.

DESCRIPTION OF THE PREFERRED EMBODIMENTS

Figure 1:
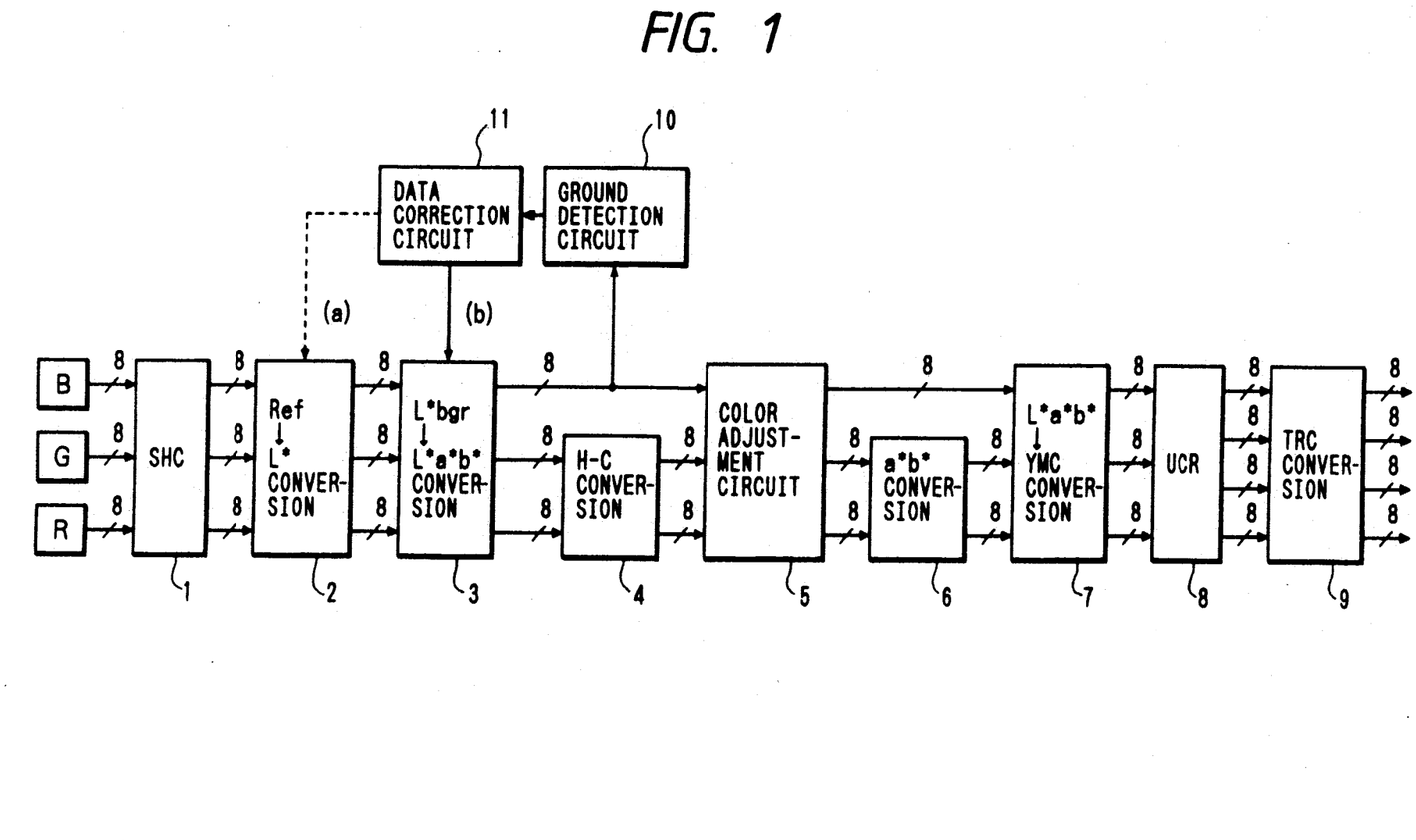
FIG. 1 is a diagram illustrative of a ground removing method for an image forming apparatus, which is an embodiment of the invention.

FIG. 1 is a diagram illustrative of a ground fog removing system for a color image forming apparatus, which is an embodiment of the invention.

In FIG. 1, a shading correction circuit 1 corrects, per pixel, shift among B, G, R pixels, inter-chip variation, inter-pixel variation within each chip, nonuniform illumination, and the like when a document is read by color separation using CCD sensors. An L* conversion circuit 2 converts a reflectance signal read by the CCD sensors into a lightness scale signal L*bgr, while an L*a*b* conversion circuit 3 converts the lightness signal L*bgr into a reference system value (L*a*b*) signal. Here, an L* axis of the system value indicates lightness, and a two-dimensional plane formed by an a* axis and a b* axis, each being orthogonal to the L* axis, indicates chroma and hue, respectively. An HC conversion circuit 4 generates an HC signal from the system value (L*a*b*) signal. A color adjustment circuit 5 makes color adjustment, color recognition, and color conversion with $H+\Delta H$, $V+\Delta V$ or $\beta V$, $\gamma C$, while an a*b* conversion circuit 6 converts the HC signal of HC conversion circuit 4 back to an a*b* signal. An YMC conversion circuit 7 converts the system value (L*a*b*) signal into recording signals Y, M, C, while a UCR 8 generates an appropriate amount of K so as not to cause turbidity in the respective reproduced colors and reduces the signals Y, M, C in proportion to the amount of K generated. A TRC conversion circuit 9 converts the tone level in accordance with the recording characteristic of the IOT, and further makes color balance and contrast adjustments. A ground detection circuit 10 detects the ground level of a document by preparing a histogram from the L* signal at the time of prescanning, while a data correction circuit 11 calculates correction data based on the detected ground level and changes parameters of Ref→L* conversion circuit 2. For example, the ground level is detected by ground detection circuit 10, and if the ground level to be corrected is 30, then such a linear function as passing through points (30, 0) and (255, 255) is generated at data correction circuit 11 and the generated curve is combined with a RGB lightness scale curve to thereby generate and set a correction curve as shown in FIG. 2.

Figure 3A:
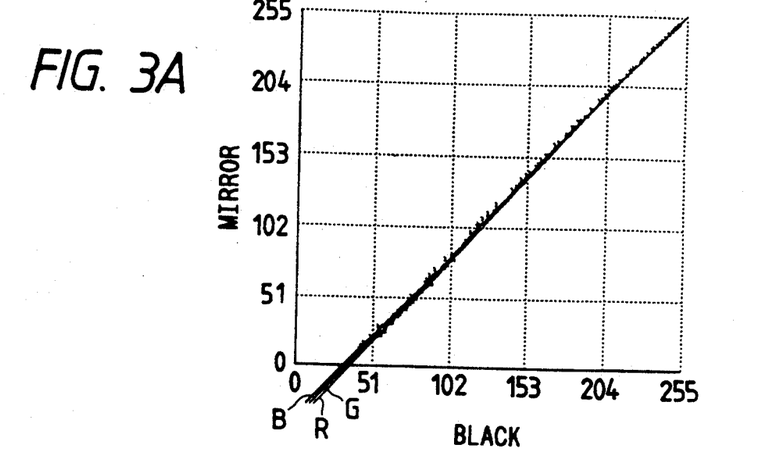
FIGS. 3A to 3C are diagrams illustrative of correction data.
Figure 3B:
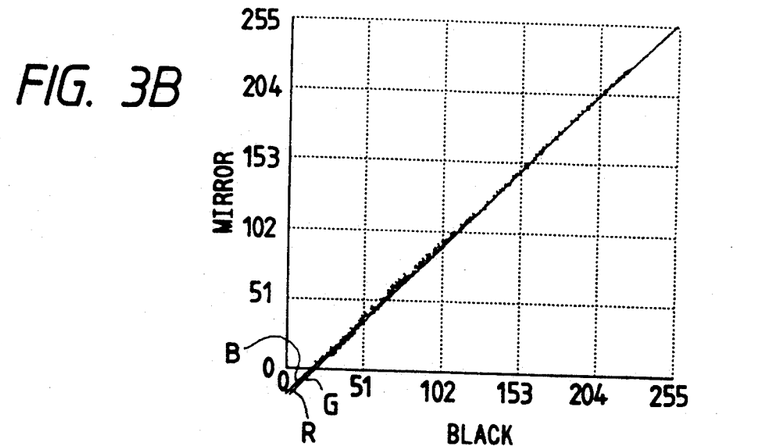
Figure 3C:
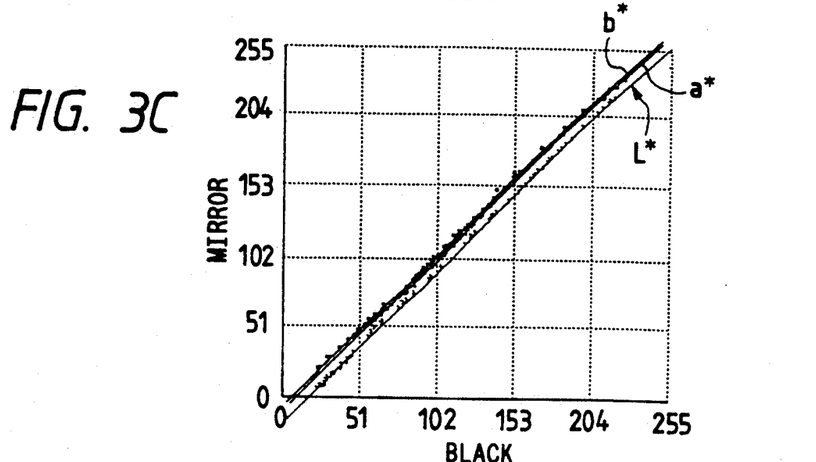

FIG. 3 shows the results of sampling the color-separated signals to the IIT from a thin-sheet document that is relatively transmissive when both a mirror surface-finished platen cover and a low light, achromatic rubber belt platen cover were used.

FIG. 3A shows an RGB reflectance with the black belt as the horizontal axis and the mirror surface as the vertical axis. As is understood from the figure, the reflectance in the case of the black belt is lower than that in the case of the mirror surface, but as the reflectance becomes lower as it nears 255, the difference becomes so small that it is understood that the correction can be made with a linear approximation ($\alpha X + \beta$). Similarly, FIG. 3B shows the RGB lightness scale with the black belt as the horizontal axis and the mirror surface as the vertical axis, while FIG. 3C, the L*a*b* value with the black belt as the horizontal axis and the mirror surface as the vertical axis. Similarly, it is understood that the correction can be made with a linear approximation.

Figure 2:
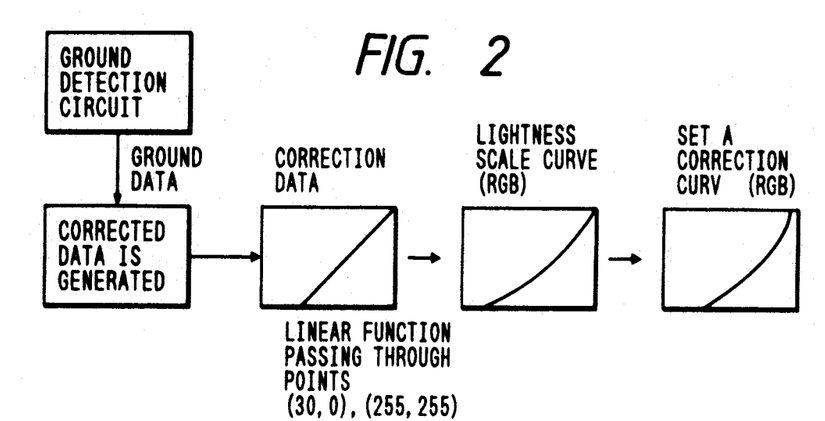
FIG. 2 is a diagram illustrative of a ground removing algorithm.

Therefore, as shown in FIG. 2, the correction data is obtained with the linear approximation ($\alpha X + \beta$) from the ground level detected by prescanning and the correction curve is set by merging the linear approximation with the reference curve (conversion curve) set at Ref→L* conversion circuit 2 before the main scanning, so that fog attributable to the platen cover lining can be reduced. It is obvious that a more accurate correction can be made if correction data for each of the R, G, B signals are used. However, since no big difference is observed among R, G, B signals as shown in FIG. 3A, a single piece of correction data which is an average among the respective R, G, B correction data may be used and commonly applied to each of the R, G, B signals. This allows processing time and costs to be curtailed. It goes without saying that the correction curve is set not only by L* conversion circuit 2, but may also be set by L*a*b* conversion circuit 3 as shown in FIG. 1B.

For example, L*a*b* conversion circuit 3 makes corrections based on the following equation.

$$\begin{bmatrix} L^* \\ a^* \\ b^* \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} B \\ G \\ R \end{bmatrix} + \begin{bmatrix} A_{14} \\ A_{24} \\ A_{34} \end{bmatrix}$$

With respect to the parameters of the above equation, a correction can be made using the RGB lightness scale data in the following way.

$$\begin{bmatrix} L^* \\ a^* \\ b^* \end{bmatrix} = \begin{bmatrix} \alpha_b \times A_{11} & \alpha_g \times A_{12} & \alpha_r \times A_{13} \\ \alpha_b \times A_{21} & \alpha_g \times A_{22} & \alpha_r \times A_{23} \\ \alpha_b \times A_{31} & \alpha_g \times A_{32} & \alpha_r \times A_{33} \end{bmatrix} \begin{bmatrix} B \\ G \\ R \end{bmatrix} +$$

$$\begin{bmatrix} A_{11} & A_{12} & A_{13} \\ A_{21} & A_{22} & A_{23} \\ A_{31} & A_{32} & A_{33} \end{bmatrix} \begin{bmatrix} \beta_b \\ \beta_g \\ \beta_r \end{bmatrix} + \begin{bmatrix} A_{14} \\ A_{24} \\ A_{34} \end{bmatrix}$$

A correction can be made using L*a*b* data in the following way.

$$\begin{bmatrix} L^* \\ a^* \\ b^* \end{bmatrix} = \begin{bmatrix} \alpha_b \times A_{11} & \alpha_g \times A_{12} & \alpha_r \times A_{13} \\ \alpha_b \times A_{21} & \alpha_g \times A_{22} & \alpha_r \times A_{23} \\ \alpha_b \times A_{31} & \alpha_g \times A_{32} & \alpha_r \times A_{33} \end{bmatrix} \begin{bmatrix} B \\ G \\ R \end{bmatrix} +$$

$$\begin{bmatrix} \beta_L + \alpha_L \times A_{13} \\ \beta_a + \alpha_a \times A_{23} \\ \beta_b + \alpha_b \times A_{33} \end{bmatrix}$$

A result of a correction of the invention performed with a specific value will be described next. When the ground of a thin-sheet document that is relatively transmissive with respect to light of certain wavelengths is read and the read data is converted to L* data, data 92–93 were obtained at a ground level L* with the mirror surface and data 86–87, at a ground level L* with the low light, achromatic surface, assuming that the L* scale ranges from 0 to 100. When the ground level L* 86–87 was detected by prescanning, the detected ground level was converted by a reflectance signal ranging from 0 to 255 inputted from the IIT, whereby such a linear conversion equation as to pass through points (30, 0), (255, 255) was prepared with a correction point at L* conversion circuit 2 being set to about 30 so as to correspond to the above data correction. Then, such data was combined with the reference curve by software to set the correction curve. Color reproducibility resulting from the correction of the invention was evaluated using 87 kinds (n=87) of color samples and it is found from the evaluation that the effect of the correction is significant, being highly correlative with the above linear approximation ($\alpha X + \beta$).

Evaluating the specific effect of the correction in a similar manner, the following result was obtained as color difference data of the color difference samples between the case of using a mirror surface platen cover lining and the case of using a low light achromatic rubber belt platen cover lining.

a) Not corrected     Average $\Delta E = 4.8$ ($\Delta E_{MAX} = 8.4$)
b) Corrected (per R,G,B)     Average $\Delta E = 0.7$ ($\Delta E_{MAX} = 1.6$)

-continued

| c) Corrected (per R,G,B) | Average ΔE = 1.2 (ΔE$_{MAX}$ = 3.1) |
| b) Corrected (same R,G,B) | Average ΔE = 1.3 (ΔE$_{MAX}$ = 2.6) |

The average ΔE designates an average color difference, and ΔE$_{MAX}$, the maximum color difference. The correction (b) is a case in which the correction data was fed back to L* conversion circuit 2, the correction (c), a case in which the correction data was fed back to L*a*b* conversion circuit 3, and the correction (d), a case in which the R, G, B signals were corrected by a single piece of correction data.

By the way, in operating color copying machines, there is a need for completely removing the background color originally given to a document in the black and white mode. When the processing of the above embodiment is employed to meet such need, the ground correction point must be set drastically to such a point as to completely "take away" the ground color, and if color editing is performed on a document having a background color, noticeable errors are found in color edit data, color recognition data, and color correction data in the ground correction, thus not allowing correct processing to be performed.

Further, the color copying machine can process data in accordance with the type of document, and when a document such as a photograph or a map is processed in a single mode, the ground removing operation may be skipped. However, if the document has both character data and opaque data such a photograph on a thin sheet that is relatively transmissive with the photograph being bonded thereon, and if the user specifies an area in the document, then a regular ground removal is not enough to produce a satisfactory image.

Therefore, to make a copy of a document having a mixture of photographs and characters by the color copying machine, the user must selectively correct data seen through from the back side of the document and then remove the ground fog. An example will be described below.

Figure 4:
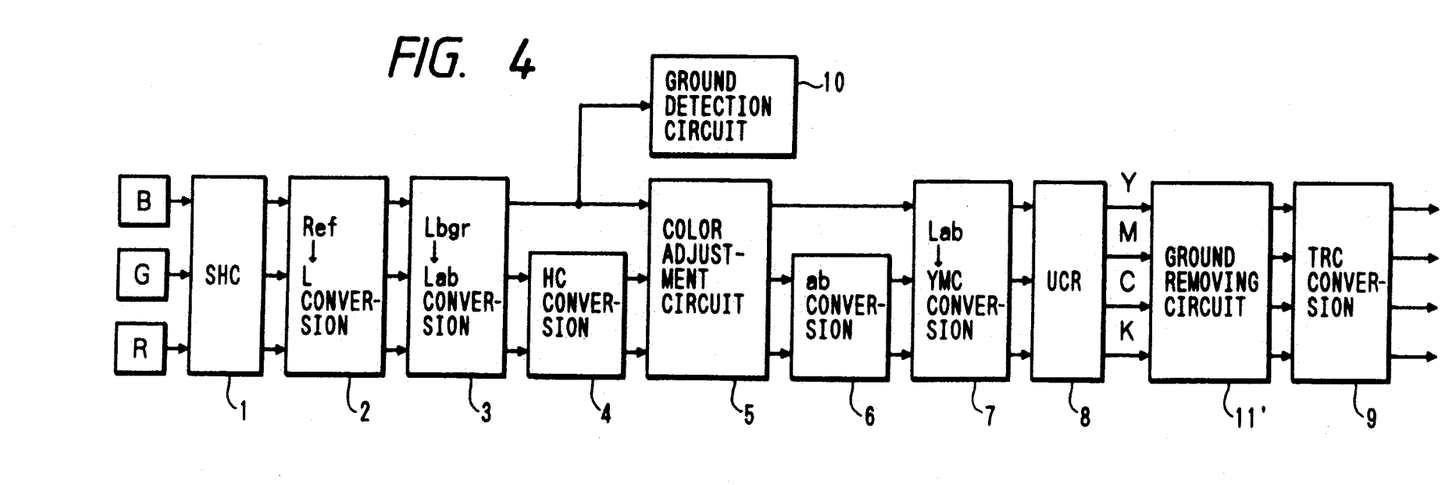
FIG. 4 is a diagram illustrative of a ground removing method for an image forming apparatus, which is another embodiment of the invention.
Figure 5A:
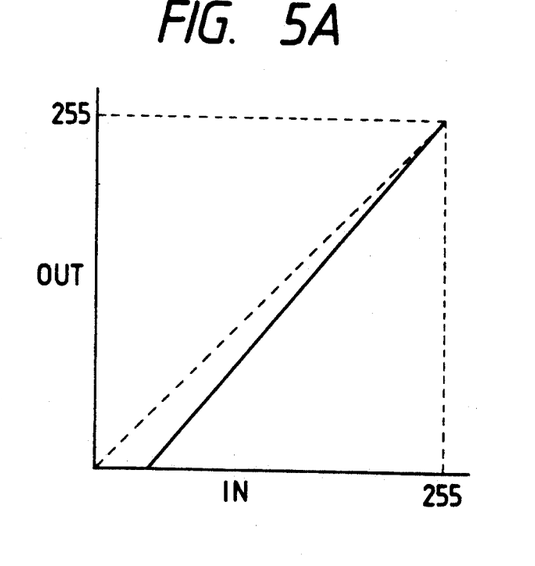
FIGS. 5A and 5B are diagrams illustrative of correction characteristics.
Figure 5B:
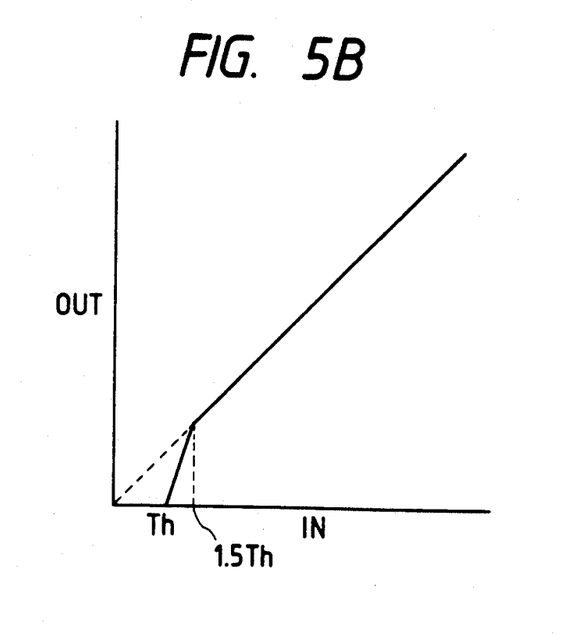

FIG. 4 is a diagram illustrative of a ground removing system for a color image forming apparatus, which is another embodiment of the invention; and FIG. 5 is a diagram illustrative of its correction characteristics. In FIG. 4, the same reference numerals as in FIG. 1 designate the same circuits, and it is designed with this embodiment so that ground fog is removed at the input section and the ground is removed at the output section.

Ground fog removal at the input section is effected by using Ref-L* conversion 2 of an LUT that corrects the characteristic of the input unit. A linear correction such as shown in FIG. 5A is performed. Since this ground fog removing operation involves correction of data seen through from the back side of the document, the highlight side is corrected with emphasis while keeping the high density side from being less affected by the correction. By removing the fog of a document while taking the ground fog away at the input section, a satisfactory image signal excluding back side data can be fed to the subsequent color edit circuits so that normal color editing can be achieved.

Further, the switching between an ENL and LUT of each of a plurality of ENL-LUT circuits that are provided by type of document for area specification allows selective ground fog removal to be achieved, with which no ground fog removal is thus effected on, e.g., photographs and maps.

The background inherent in a document can be subjected to broken-line correction by a ground removing circuit 11' as shown in FIG. 5B. Such ground removal is designed to remove the original background of the document. With the broken-line correction, the background can be taken away with no erratic jump in tone and no overall shift causing a reduction in density.

More specifically, a ground removal effected by simply comparing the ground color with a threshold leaves a sense of incompatibility with respect to ground color components unremoved by such removal. For example, when the ground of a document is changed from white to newspaper or blueprint, unremovable edge portions and noise show up. To overcome this problem, not only image data below the threshold is removed simply as a ground color, but also the threshold is gradually excluded. This contributes to reducing the sense of incompatibility. FIG. 5B shows the relationship between the input image data and the output image data when this process has been performed. As is apparent from FIG. 5B, this processing does not output input image data exceeding the threshold Th as it is, but subjects input image data ranging from the threshold Th to 1.5 times the threshold Th to a smoothing process. If the input image data is below the threshold Th, 0 is set as its output image data, while if the input image data takes values larger than a value of 1.5 times the threshold Th, the input image data itself is set as its output image data, and with respect to input image data between them, a value obtained by multiplying the difference between the input image data and the threshold by 3 is set as its output image data. More specifically, assuming that IN is the input image data and that OUT is the output image data, the output image data is obtained as follows.

$$OUT = (IN - Th) \times 3$$

The invention is not limited to the above embodiments but may be modified in various ways. For example, while the example of a thin-sheet document having character data with a photograph bonded on the document has been described in the above embodiments, a document such as a photograph or a map may not be subjected to ground removal at the input section but subjected to only ground removal at the output section, or correction values may be changed depending on the type of the document reading section, either a platen or a ADF (Auto Document Feeder).

Further, the operation of updating a Ref to L* conversion table is time-consuming if calculated based on the ground detection result. To cope with this problem, the calculation results may be stored in a RAM or ROM in advance so that the Ref to L* conversion table can be updated where necessary. This technique dispenses with the time-consuming calculation taking place every ground detection, thereby reducing the processing time.

As is apparent from the foregoing description, the invention, using such a simple correction data as a linear function, allows ground fog attributable to the platen cover lining to be removed easily as well as accurately for a thin-sheet document that is easy to transmit light. Therefore, even platen cover linings which are so dark as to barely allow a document to be detected can be used. Further, even for a thin-sheet document which is easy to transmit light and which has images on both sides, the invention prevents the back-side image from being reproduced. Still further, the correction both at the input section and at the output section provides the advantage not only of getting rid of the negative effect of the platen cover lining but also of removing the ground of the document. Therefore, when a dark platen cover such as in an ADF satisfactory copies can be produced. In addition, the ground fog derived from transparency of the platen cover is removed at the input section and the ground of the document itself is removed at the output section, so that acceptable results can be obtained at the time of recognizing the colors during image processing.

What is claimed is:

1. A ground fog removing system for an image forming apparatus, such as a color image forming apparatus in which color-separated signals B, G, R are converted into colorant recording signals Y, M, C, K through a color conversion means, said system comprising:
   ground detection means for detecting the level of a ground of a document; and
   data correction means for calculating correction data based on said detected ground level,
   wherein said system detects said level of a ground of a document by prescanning, calculating said correction data, and changing parameters of said color conversion means in accordance with said correction data, and wherein said correction data is set while approximating said detected ground level with a linear function.

2. A ground fog removing system for an image forming apparatus, such as a color image forming apparatus in which color-separated signals B, G, R are converted into colorant recording signals Y, M, C, K through a color conversion means, said system comprising:
   ground detection means for detecting the level of a ground of a document; and
   data correction means for calculating correction data based on said detected ground level,
   wherein said system detecting said level of a ground of a document by prescanning, calculating said correction data, and changing parameters of said color conversion means in accordance with said correction data, and wherein a plurality of color conversion means are provided so that ground fog can be removed selectively by area.

3. A ground fog removing system for an image forming apparatus, such as a color image forming apparatus in which color-separated signals B, G, R are converted into colorant recording signals Y, M, C, K through a color conversion means, said system comprising:
   ground detection means for detecting a level of a ground of a document;
   data correction means for calculating correction data based on said detected ground level; and
   a ground removing circuit for removing said ground based on said correction data at a recording signal output section,
   wherein said ground removing circuit performs a broken-line correction from a ground level threshold.

4. A color image forming apparatus comprising:
   ground detection means for detecting a level of a ground of a document;
   data correction means for calculating correction data based on said detected ground level;
   color conversion means for converting color-separated signals B, G, R read from the document into colorant recording signals Y, M, C, K; and
   grounding removing means for removing said ground from the colorant recording signals Y, M, C, K based on the correction data.

5. A color image forming apparatus comprising:
   ground detection means for detecting a level of a ground of a document during a prescan of a document;
   data correction means for calculating correction data based on the detected ground level, and for adjusting color conversion parameters in accordance with the correction data;
   first color conversion means for converting color-separated signals B, G, R read from the document into reference system signals in accordance with the adjusted color conversion parameters; and
   second color conversion means for converting the reference system signals into colorant recording signals Y, M, C, K.

6. The color image forming apparatus of claim 5, wherein the ground level is detected using a lightness signal.

7. The color image forming apparatus of claim 5, wherein the correction data is calculated using a lightness signal.

8. The color image forming apparatus of claim 5, wherein the correction data is calculated using the color-separated signals B, G, R.

* * * * *

UNITED STATES PATENT AND TRADEMARK OFFICE
CERTIFICATE OF CORRECTION

PATENT NO. : 5,245,417
DATED : September 14, 1993
INVENTOR(S) : Yoshiharu Hibi et al.

It is certified that error appears in the above-indentified patent and that said Letters Patent is hereby corrected as shown below:

Abstract, title Page, line 8, change "is" to --are--.

Abstract, title Page, line 10, change "is" to --are--.

Claim 1, column 9, line 26, change "is" to --are--.

Claim 7, column 10, line 43, change "is" to --are--.

Claim 8, column 10, line 46, change "is" to --are--.

Abstract, Front Page, line 12, change "back-side" to --backside--.

Signed and Sealed this

Twentieth Day of September, 1994

Attest:

BRUCE LEHMAN

Attesting Officer

Commissioner of Patents and Trademarks